Oct. 6, 1925. Re. 16,183

W. C. BURRELL

JOIST BRIDGING

Original Filed Dec. 11, 1922

WITNESSES:-

Chas. L. Gigelmer

Emory R. Griff

INVENTOR

William C. Burrell,

By D. T. Wolcott Jr.

Attorney

Reissued Oct. 6, 1925. Re. 16,183

UNITED STATES PATENT OFFICE.

WILLIAM C. BURRELL, OF KANKAKEE, ILLINOIS, ASSIGNOR TO THE GENERAL FIRE-PROOFING COMPANY, OF YOUNGSTOWN, OHIO, A CORPORATION OF OHIO.

JOIST BRIDGING.

Original No. 1,514,577, dated November 4, 1924, Serial No. 606,077, filed December 11, 1922. Application for reissue filed March 14, 1925. Serial No. 15,655.

*To all whom it may concern:*

Be it known that I, WILLIAM C. BURRELL, a citizen of the United States, residing at Kankakee, in the county of Kankakee, Illinois, have invented certain new and useful Improvements in Joist Bridging, of which the following is a specification.

My invention relates to devices for uniting objects and is of particular service when embodied in braces for uniting and strengthening the assemblage of floor joists or other objects.

The brace of my invention comprises diverging members formed of sheet metal. When the invention is embodied in braces for uniting floor joists or the like, these members desirably cross at their mid portions, these mid portions being joined by metal preferably integrally formed with the brace members. Each of the members of the brace is preferably angular in cross section simulating an angle iron.

The ends of each brace member are desirably angularly deflected to constitute ears to lie against the opposing faces of the joists, these ears desirably being provided with holes through which nails or other fastening devices may be passed.

Figure 1:
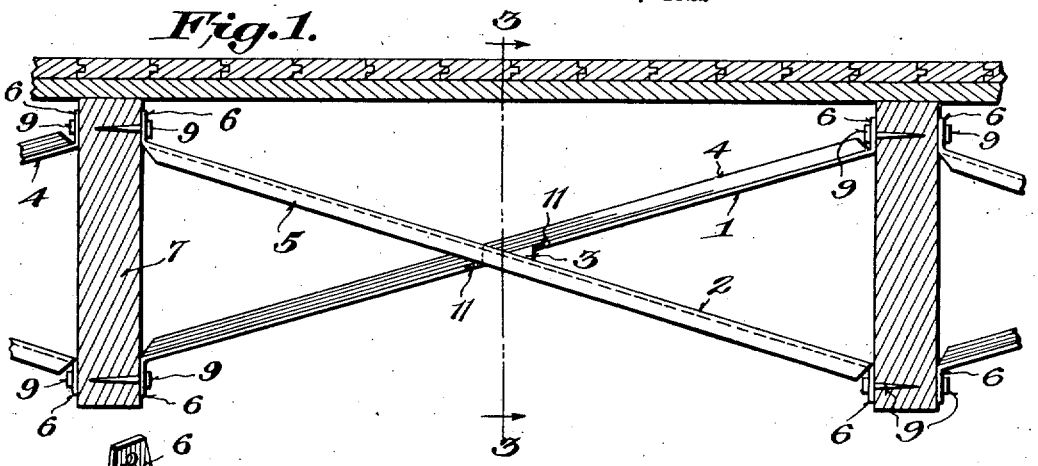
Figure 2:
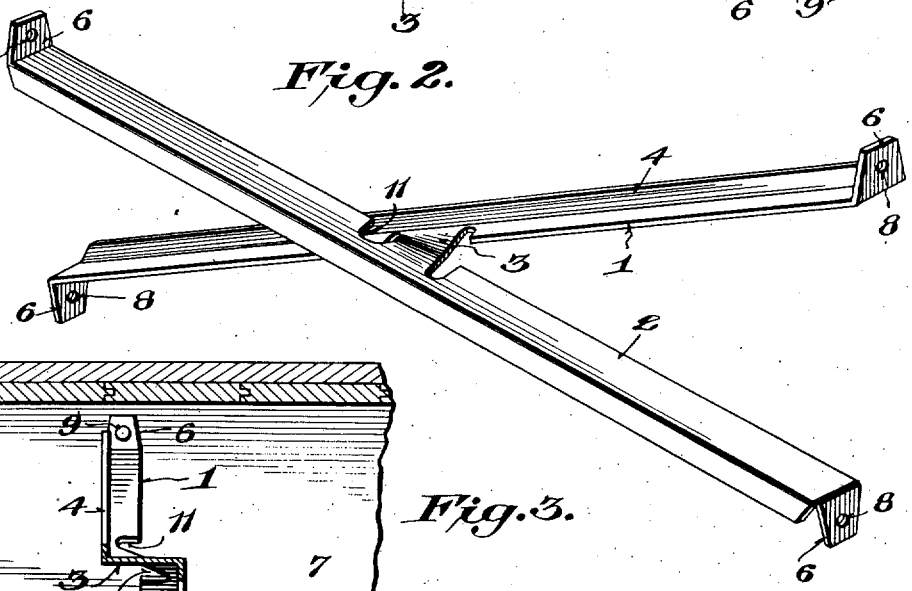
Figure 3:
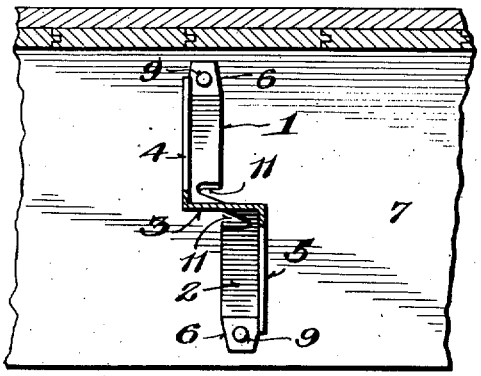
Figure 4:
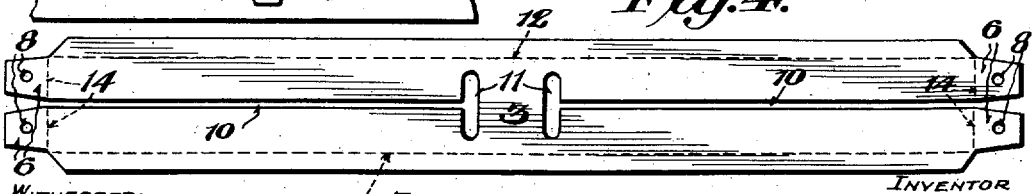

The invention will be more fully explained by reference to the accompanying drawing in which Fig. 1 is a view in elevation of a complete brace constructed in accordance with the preferred embodiment of the invention, joists with which this brace is united, portions of other braces assembled with these joists, and a floor structure upon the joists being shown; Fig. 2 is a perspective view of the brace illustrated in Fig. 1; Fig. 3 is a sectional view on line 3—3 of Fig. 1; and Fig. 4 is a plan view of a blank which is so shaped that the brace may be formed therefrom when the blank is suitably bent.

Like parts are indicated by similar characters of reference throughout the different figures.

The brace illustrated includes the elongated members 1 and 2 that are crossed at their mid portions and are there united by a bridging piece 3 formed integrally with the members 1 and 2 out of the same piece of metal and slightly twisted to permit said members to have the angular or diverging and crossing relation illustrated.

In order that the brace members may be strengthened they are provided with angular continuations 4 and 5 along their outer longitudinal edges, these angular extensions also being integrally formed with the brace members.

Any suitable means of attachment may be provided for securing the brace members to the objects that are to be assembled and strengthened thereby. As illustrated, this means resides in ears 6 that are formed at the outer ends of the brace members 1 and 2 and are directed to lie snugly against the joists 7 or other objects which are united by the brace. Each of the ears may be formed with a hole 8 for the passage of any suitable fastening device therethrough such as the nails 9 which are shown as passing through the holes 8 into the joists 7.

Flat sheet metal is preferably employed in the production of the braces. Long strips are stamped out of the sheet metal to have the shape illustrated in Fig. 4. The metal strip there shown has two aligned longitudinal slits 10 that terminate short of each other at the middle of the strip and leave the bridging piece 3. These slits permit one-half of the metal strip to be twisted with respect to the other, the bridging piece maintaining the unity of the two halves of the strip. In order that sufficient metal may be included in the bridging piece to enable the desired twisting thereof without impairing the structural shape of the resulting brace, transverse slits 11, margining the bridging piece, are formed at the inner ends of the slits 10 and communicate therewith. The transverse slits 11 are preferably employed in order that the planes in which the elongated members 1 and 2 are disposed may be as close as possible, but the invention is not to be thus restricted.

Preferably before the brace members are twisted into their final relative positions they are bent along the longitudinal lines 12 and 13 to form the angular brace member portions 4 and 5. At any suitable stage in the process of formation the brace ears 6 are deflected along the transverse lines 14.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. As a new article of manufacture, two elongated members which cross at their mid portions and a bridging piece uniting said members where they cross and formed integrally therewith out of a piece of sheet metal, there being transverse slits margining the bridging piece to bring said members closer together, said members being bent along longitudinal lines to make them angular in cross section and on transverse lines near their ends to constitute ears.

2. As a new article of manufacture, two elongated members which cross at their mid portions and a bridging piece uniting said members where they cross and formed integrally therewith out of a piece of sheet metal, there being transverse slits margining the bridging piece to bring said members closer together, said members being bent along longitudinal lines to make them angular in cross section.

3. As a new article of manufacture, two elongated members which cross at their mid portions and a bridging piece uniting said members where they cross and formed integrally therewith out of a piece of sheet metal, there being transverse slits margining the bridging piece to bring said members closer together.

4. As a new article of manufacture, two elongated members and a bridging piece uniting said members and integrally formed therewith out of a piece of sheet metal, said members being bent along longitudinal lines to make them angular in cross section and on transverse lines at ends thereof to form ears, the device being transversely slitted along said bridging piece to bring said members closer together.

5. As a new article of manufacture, two elongated members and a bridging piece uniting said members and integrally formed therewith out of a piece of sheet metal, said members being bent along longitudinal lines to make them angular in cross section, the device being transversely slitted along said bridging piece to bring said members closer together.

6. As a new article of manufacture, two elongated members and a bridging piece uniting said members and integrally formed therewith out of a piece of sheet metal, the device being transversely slitted along said bridging piece to bring said members closer together.

7. A joist brace comprising a single blank of sheet metal provided with coaxial longitudinal slits extending through the ends of the blank and terminating short of each other at an intermediate point in the blank, said blank being provided at the inner terminal of each slit with an opening.

8. A joist brace comprising a single blank of sheet metal provided with coaxial longitudinal slits terminating short of each other at an intermediate point leaving an intervening bridge piece or connector, the separate members of the blank respectively at opposite sides of the slits being adapted to be moved into angular crossing relation upon twisting of the bridge piece.

9. A joist brace comprising a single blank of sheet metal provided with coaxial longitudinal slits respectively extending through opposite end portions of the blank and terminating short of each other at an intermediate point leaving an intervening bridge piece or connector, the separate members of the blank respectively at opposite sides of the slits being adapted to be moved into angular crossing relation upon twisting of the bridge piece.

In testimony whereof I hereunto affix my signature.

WILLIAM C. BURRELL.